United States Patent [19]

Peleg et al.

[11] Patent Number: 5,818,739
[45] Date of Patent: *Oct. 6, 1998

[54] PROCESSOR FOR PERFORMING SHIFT OPERATIONS ON PACKED DATA

[75] Inventors: Alexander Peleg; Yaakov Yaari; Millind Mittal, all of Haifa, Israel; Larry M. Mennemeier, Boulder Creek, Calif.; Benny Eitan, Haifa, Israel

[73] Assignee: Intel Corporation, Santa Clara, Calif.

[*] Notice: The term of this patent shall not extend beyond the expiration date of Pat. No. 5,666,298.

[21] Appl. No.: 840,245

[22] Filed: Apr. 17, 1997

Related U.S. Application Data

[63] Continuation of Ser. No. 701,564, Aug. 22, 1996, Pat. No. 5,666,298, which is a continuation of Ser. No. 349,730, Dec. 1, 1994, abandoned.

[51] Int. Cl.$^6$ ........................................... G06F 5/01
[52] U.S. Cl. ........................... 364/715.08; 395/564
[58] Field of Search ............... 364/715.08; 395/564, 395/376

[56] References Cited

U.S. PATENT DOCUMENTS

| | | | |
|---|---|---|---|
| 3,711,692 | 1/1973 | Batcher | 235/175 |
| 3,723,715 | 3/1973 | Chen et al. | 235/175 |
| 4,161,784 | 7/1979 | Cushing et al. | 364/748 |
| 4,393,468 | 7/1983 | New | 364/736 |
| 4,418,383 | 11/1983 | Doyle et al. | 364/200 |
| 4,451,883 | 5/1984 | Stanley et al. | 364/715.08 |
| 4,498,177 | 2/1985 | Larson | 371/52 |
| 4,583,197 | 4/1986 | Chappell et al. | 364/715.08 |
| 4,707,800 | 11/1987 | Montrone et al. | 364/788 |
| 4,890,251 | 12/1989 | Nitta et al. | 364/715.08 |
| 4,931,971 | 6/1990 | Cook et al. | 364/715.08 |
| 4,989,168 | 1/1991 | Kuroda et al. | 364/715.09 |
| 5,095,457 | 3/1992 | Jeong | 364/758 |
| 5,187,679 | 2/1993 | Vassiliadis et al. | 364/786 |
| 5,201,056 | 4/1993 | Daniel et al. | 395/375 |
| 5,295,250 | 3/1994 | Komoto et al. | 395/325 |
| 5,327,571 | 7/1994 | McMinn et al. | 395/375 |
| 5,379,240 | 1/1995 | Byrne | 364/715.08 |
| 5,408,670 | 4/1995 | Daries | 364/736 |
| 5,418,915 | 5/1995 | Matuda et al. | 364/736 |
| 5,477,543 | 12/1995 | Purell | 364/715.08 |
| 5,481,746 | 1/1996 | Schiffleger et al. | 364/715.08 |

OTHER PUBLICATIONS

Sun Microsystem, Inc. SPARC Technologn Business Ultra SPARC, "Ultra SPARC Multimedia Capabilities One–Chip Support for Real–Time Video & Advance Graphics", Sep. 1994, 8 pp.

Microprocessor Report, Brain Case, "Philips Hopes to Displace DSPs with VLIW:Tri Media Processors Aimed at Future Multimedia Embedded Apps," Dec. 5, 1994, pp. 12–18.

Microprocessor Report, Linley Gwennap, New Pa–RISC Processor Decodeds MPEG Video: HP'PA–7100LC Uses New Instructions to Eliminate Decoder Chip, Jan. 24, 1994, pp. 16–17.

(List continued on next page.)

*Primary Examiner*—David H. Malzahn
*Attorney, Agent, or Firm*—Blakely, Sokoloff, Taylor & Zafman

[57] ABSTRACT

A processor. The processor includes a decoder being coupled to receive a control signal. The control signal has a first source address, a second source address, a destination address, and an operation field. The first source address corresponds to a fist location. The second source address corresponds to a second location. The destination address corresponds to a third location. The operation field indicates that a type of packed data shift operation is to be performed. The processor further includes a circuit being coupled to the decoder. The circuit is for shifting a first packed data being stored at the first location by a value being stored at the second location. The circuit is further for communicating a corresponding result packed data to the third location.

14 Claims, 10 Drawing Sheets

OTHER PUBLICATIONS

MC88110 Second Generation–RISC Microprocessor User's Manual pp. 1–23 (Sep. 1992), pp. 2–1 through 2–22, 3–1 through 3–32, pp.5–1 through 5–25, pp. 10–62 through 10–71, Index 1 through 17, 21 thru 2–20, 3–1 thru 3–32, 1–1 thru 1–9 & 11–12–123.

MC88110 Programmer's Reference Guide, pp. 1–4, Jan. 1992.

Intel i750, i860TM, i960 Processors and Related Products, pp. 1–3 (1993).

Motorola MC88110 Second Generation RISC Microprocessor User's Manual, Motorola, Inc. 1991, Table of Contents (9 pp.).

Motorola Semiconductor Technical Data, Errata to MC88110 Second Generation RISC Microprocessor User's Manual, Motorola, Inc. 1992, pp. 1–11.

| 63 | 16 | 15 | 0 |
|---|---|---|---|
| 000 ------------------------------------ 000 | wwww wwww wwww wwww | | |

Unsigned Word In-register Representation 412

| 63 | 16 | 15 | 0 |
|---|---|---|---|
| sss ------------------------------------ sss | swww wwww wwww wwww | | |

Signed Word In-register Representation 413

FIG. 4d

| 63 | 32 | 31 | 0 |
|---|---|---|---|
| 000 ---------------------- 000 | dddd dddd dddd dddd dddd dddd dddd dddd | | |

Unsigned Doubleword In-register Representation 414

| 63 | 32 | 31 | 0 |
|---|---|---|---|
| sss ---------------------- sss | sddd dddd dddd dddd dddd dddd dddd dddd | | |

Signed Doubleword In-register Representation 415

| 63 | 47 46 | 31 30 | 15 14 | 0 |
|---|---|---|---|---|
| wwww wwww wwww wwww | wwww wwww wwww wwww | wwww wwww wwww wwww | wwww wwww wwww wwww | |

Unsigned Packed Word In-register Representation 512

| 63 | 47 46 | 31 30 | 15 14 | 0 |
|---|---|---|---|---|
| swww wwww wwww wwww | swww wwww wwww wwww | swww wwww wwww wwww | swww wwww wwww wwww | |

Signed Packed Word In-register Representation 513

FIG. 5d

| 63 | 31 30 | 0 |
|---|---|---|
| dddd dddd dddd dddd  dddd dddd dddd dddd | dddd dddd dddd dddd  dddd dddd dddd dddd | |

Unsigned Packed Doubleword In-register Representation 514

| 63 | 31 30 | 0 |
|---|---|---|
| sddd dddd dddd dddd  dddd dddd dddd dddd | sddd dddd dddd dddd  dddd dddd dddd dddd | |

Signed Packed Doubleword In-register Representation 515

PROCESSOR FOR PERFORMING SHIFT OPERATIONS ON PACKED DATA

This is a continuation of application Ser. No. 08/701,564, filed Aug. 22, 1996, now U.S. Pat. No. 5,666,298, which is a continuation of application Ser. No. 08/349,730, filed Dec. 1, 1994, now abandoned.

BACKGROUND OF THE INVENTION

1. Field of Invention

In particular, the present invention describes an apparatus and method of performing arithmetic operations using a single control signal to manipulate multiple data elements. The present invention allows execution of shift operations on packed data types.

2. Description of Related Art

Today, most personal computer systems operate with one instruction to produce one result. Performance increases are achieved by increasing execution speed of instructions and the processor instruction complexity; known as Complex Instruction Set Computer (CISC). Such processors as the Intel 80286™ microprocessor, available from Intel Corp. of Santa Clara, Calif., belong to the CISC category of processor.

Previous computer system architecture has been optimized to take advantage of the CISC concept. Such systems typically have data buses thirty-two bits wide. However, applications targeted at computer supported cooperation (CSC—the integration of teleconferencing with mixed media data manipulation), 2D/3D graphics, image processing, video compression/decompression, recognition algorithms and audio manipulation increase the need for improved performance. But, increasing the execution speed and complexity of instructions is only one solution.

One common aspect of these applications is that they often manipulate large amounts of data where only a few bits are important. That is, data whose relevant bits are represented in much fewer bits than the size of the data bus. For example, processors execute many operations on eight bit and sixteen bit data (e.g., pixel color components in a video image) but have much wider data busses and registers. Thus, a processor having a thirty-two bit data bus and registers, and executing one of these algorithms, can waste up to seventy-five percent of its data processing, carrying and storage capacity because only the first eight bits of data are important.

As such, what is desired is a processor that increases performance by more efficiently using the difference between the number of bits required to represent the data to be manipulated and the actual data carrying and storage capacity of the processor.

SUMMARY OF THE INVENTION

A processor having shift operations that operate on multiple data elements is described.

A processor. The processor includes a decoder being coupled to receive a control signal. The control signal has a first source address, a second source address, a destination address, and an operation field. The first source address corresponds to a first location. The second source address corresponds to a second location. The destination address corresponds to a third location. The operation field indicates that a type of packed data shift operation is to be performed. The processor further includes a circuit being coupled to the decoder. The circuit is for shifting a first packed data being stored at the first location by a value being stored at the second location. The circuit is further for communicating a corresponding result packed data to the third location.

Although a great deal of detail has been included in the description and figures, the invention is defined by the scope of the claims. Only limitations found in those claims apply to the invention.

BRIEF DESCRIPTION OF THE DRAWINGS

The present invention is illustrated by way of example, and not limitation, in the figures. Like references indicate similar elements.

DESCRIPTION OF THE PREFERRED EMBODIMENT

Overview

A processor having shift operations that operate on multiple data elements is described. In the following description, numerous specific details are set forth such as circuits, etc., in order to provide a thorough understanding of the present invention. In other instances, well-known structures and techniques have not been shown in detail in order not to unnecessarily obscure the present invention.

Definitions

To provide a foundation for understanding the description of the embodiments of the present invention, the following definitions are provided.

Bit X through Bit Y:

defines a subfield of binary number. For example, bit six through bit zero of the byte $00111010_2$ (shown in base two) represent the subfield $111010_2$. The '$_2$' following a binary number indicates base 2. Therefore, $1000_2$ equals $8_{10}$, while $F_{16}$ equals $15_{10}$.

Rx:

is a register. A register is any device capable of storing and providing data. Further functionality of a register is described below. A register is not necessarily part of the processor's package.

DEST:

is a data address.

SRC1:

is a data address.

SRC2:

is a data address.

Result:

is the data to be stored in the register addressed by DEST.

Source1:

is the data stored in the register addressed by SRC1.

Source2:

is the data stored in the register addressed by SRC2.

Computer System

Figure 1:
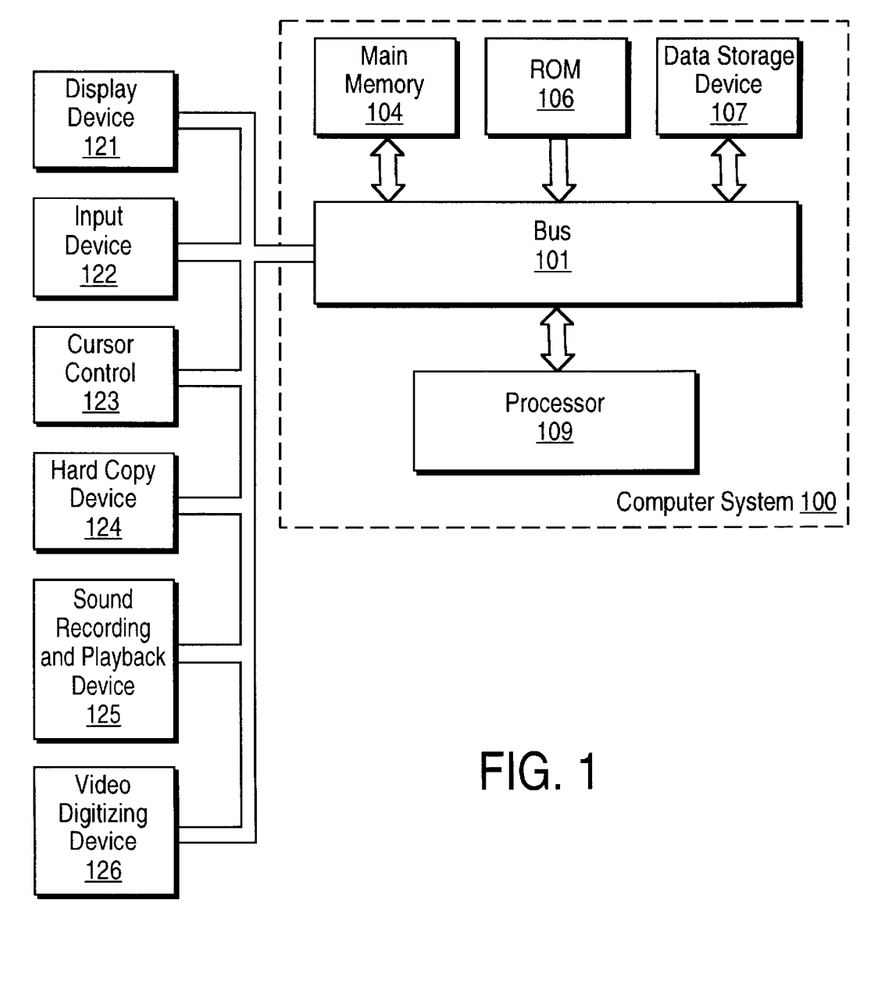
FIG. 1 illustrates an embodiment of the computer system using the methods and apparatus of the present invention.

Referring to FIG. 1, a computer system upon which an embodiment of the present invention can be implemented is shown as computer system 100. Computer system 100 comprises a bus 101, or other communications hardware and software, for communicating information, and a processor 109 coupled with bus 101 for processing information. Computer system 100 further comprises a random access memory (RAM) or other dynamic storage device (referred to as main memory 104), coupled to bus 101 for storing information and instructions to be executed by processor 109. Main memory 104 also may be used for storing temporary variables or other intermediate information during execution of instructions by processor 109. Computer system 100 also comprises a read only memory (ROM) 106, and/or other static storage device, coupled to bus 101 for storing static information and instructions for processor 109. Data storage device 107 is coupled to bus 101 for storing information and instructions.

Furthermore, a data storage device 107, such as a magnetic disk or optical disk, and its corresponding disk drive, can be coupled to computer system 100. Computer system 100 can also be coupled via bus 101 to a display device 121 for displaying information to a computer user. Display device 121 can include a frame buffer, specialized graphics rendering devices, a cathode ray tube (CRT), and/or a flat panel display. An alphanumeric input device 122, including alphanumeric and other keys, is typically coupled to bus 101 for communicating information and command selections to processor 109. Another type of user input device is cursor control 123, such as a mouse, a trackball, a pen, a touch screen, or cursor direction keys for communicating direction information and command selections to processor 109, and for controlling cursor movement on display device 121. This input device typically has two degrees of freedom in two axes, a first axis (e.g., x) and a second axis (e.g., y), which allows the device to specify positions in a plane. However, this invention should not be limited to input devices with only two degrees of freedom.

Another device which may be coupled to bus 101 is a hard copy device 124 which may be used for printing instructions, data, or other information on a medium such as paper, film, or similar types of media. Additionally, computer system 100 can be coupled to a device for sound recording, and/or playback 125, such as an audio digitizer coupled to a microphone for recording information. Further, the device may include a speaker which is coupled to a digital to analog (D/A) converter for playing back the digitized sounds.

Also, computer system 100 can be a terminal in a computer network (e.g., a LAN). Computer system 100 would then be a computer subsystem of a computer system including a number of networked devices. Computer system 100 optionally includes video digitizing device 126. Video digitizing device 126 can be used to capture video images that can be transmitted to others on the computer network.

Computer system 100 is useful for supporting computer supported cooperation (CSC—the integration of teleconferencing with mixed media data manipulation), 2D/3D graphics, image processing, video compression/decompression, recognition algorithms and audio manipulation.

Processor

Figure 2:
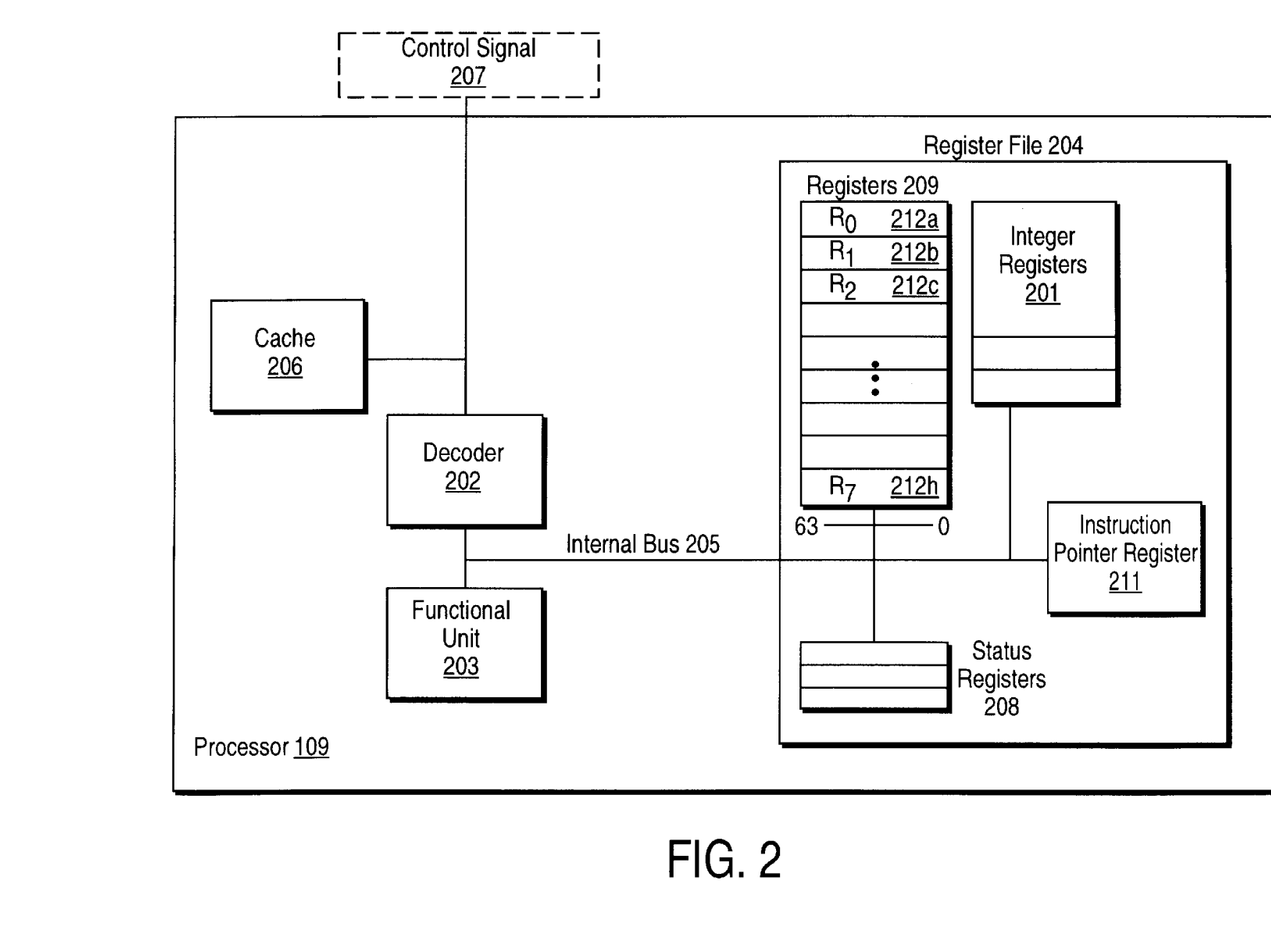
FIG. 2 illustrates an embodiment of the processor of the present invention.

FIG. 2 illustrates a detailed diagram of processor 109. Processor 109 can be implemented on one or more substrates using any of a number of process technologies, such as, BiCMOS, CMOS, and NMOS.

Processor 109 comprises a decoder 202 for decoding control signals and data used by processor 109. Data can then be stored in register file 204 via internal bus 205. As a matter of clarity, the registers of an embodiment should not be limited in meaning to a particular type of circuit. Rather, a register of an embodiment need only be capable of storing and providing data, and performing the functions described herein.

Depending on the type of data, the data may be stored in integer registers 201, registers 209, status registers 208, or instruction pointer register 211. Other registers can be included in the register file 204, for example, floating point registers. In one embodiment, integer registers 201 store thirty-two bit integer data. In one embodiment, registers 209 contains eight registers, $R_0$ 212a through $R_7$ 212h. Each register in registers 209 is sixty-four bits in length. $R_1$ 212a, $R_2$ 212b and $R_3$ 212c are examples of individual registers in registers 209. Thirty-two bits of a register in registers 209 can be moved into an integer register in integer registers 201. Similarly, an value in an integer register can be moved into thirty-two bits of a register in registers 209.

Status registers 208 indicate the status of processor 109. Instruction pointer register 211 stores the address of the next instruction to be executed. Integer registers 201, registers 209, status registers 208, and instruction pointer register 211 all connect to internal bus 205. Any additional registers would also connect to the internal bus 205.

In another embodiment, some of these registers can be used for two different types of data. For example, registers 209 and integer registers 201 can be combined where each register can store either integer data or packed data. In another embodiment, registers 209 can be used as floating point registers. In this embodiment, packed data can be stored in registers 209 or floating point data. In one embodiment, the combined registers are sixty-four bits in length and integers are represented as sixty-four bits. In this embodiment, in storing packed data and integer data, the registers do not need to differentiate between the two data types.

Functional unit 203 performs the operations carried out by processor 109. Such operations may include shifts, addition, subtraction and multiplication, etc. Functional unit 203 connects to internal bus 205. Cache 206 is an optional element of processor 109 and can be used to cache data and/or control signals from, for example, main memory 104. Cache 206 is connected to decoder 202, and is connected to receive control signal 207.

Figure 3:
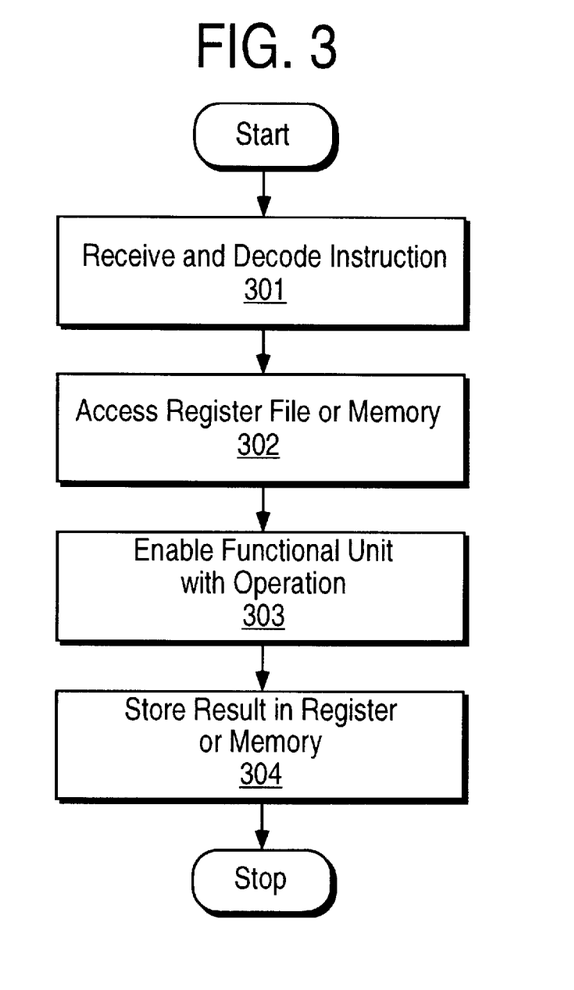
FIG. 3 is a flow diagram illustrating the general steps used by the processor to manipulate data in the register file.

FIG. 3 illustrates the general operation of processor 109. That is, FIG. 3 illustrates the steps followed by processor 109 while performing an operation on packed data, performing an operation on unpacked data, or performing some other operation. For example, such operations include a load operation to load a register in register file 204 with data from cache 206, main memory 104, read only memory (ROM) 106, or data storage device 107. In one embodiment of the present invention, processor 109 supports most of the instructions supported by the Intel 80486™, available from Intel Corporation of Santa Clara, Calif. In another embodiment of the present invention, processor 109 supports all the operations supported by the Intel 80486™, available from Intel Corporation of Santa Clara, Calif. In another embodiment of the present invention, processor 109 supports all the operations supported by the Pentium™ processor, the Intel 80486™ processor, the 80386™ processor, the Intel 80286™ processor, and the Intel 8086™ processor, all available from Intel Corporation of Santa Clara, Calif. In another embodiment of the present invention, processor 109 supports all the operations supported in the IA™—Intel Architecture, as defined by Intel Corporation of Santa Clara, Calif. (see *Microprocessors*, Intel Data Books volume 1 and volume 2, 1992 and 1993, available from Intel of Santa Clara, Calif.). Generally, processor 109 can support the present instruction set for the Pentium™ processor, but can also be modified to incorporate future instructions, as well as those described herein. What is important is that general processor 109 can support previously used operations in addition to the operations described herein.

At step 301, the decoder 202 receives a control signal 207 from either the cache 206 or bus 101. Decoder 202 decodes the control signal to determine the operations to be performed.

Decoder 202 accesses the register file 204, or a location in memory, at step 302. Registers in the register file 204, or memory locations in the memory, are accessed depending on the register address specified in the control signal 207. For example, for an operation on packed data, control signal 207 can include SRC1, SRC2 and DEST register addresses. SRC1 is the address of the first source register. SRC2 is the address of the second source register. In some cases, the SRC2 address is optional as not all operations require two source addresses. If the SRC2 address is not required for an operation, then only the SRC1 address is used. DEST is the address of the destination register where the result data is stored. In one embodiment, SRC1 or SRC2 is also used as DEST. SRC1, SRC2 and DEST are described more fully in relation to FIG. 6a and FIG. 6b. The data stored in the corresponding registers is referred to as Source1, Source2, and Result respectively. Each of these data is sixty-four bits in length.

In another embodiment of the present invention, any one, or all, of SRC1, SRC2 and DEST, can define a memory location in the addressable memory space of processor 109. For example, SRC1 may identify a memory location in main memory 104 while SRC2 identifies a first register in integer registers 201, and DEST identifies a second register in registers 209. For simplicity of the description herein, references are made to the accesses to the register file 204, however, these accesses could be made to memory instead.

In another embodiment of the present invention, the operation code only includes two addresses, SRC1 and SRC2. In this embodiment, the result of the operation is stored in the SRC1 or SRC2 register. That is SRC1 (or SRC2) is used as the DEST. This type of addressing is compatible with previous CISC instructions having only two addresses. This reduces the complexity in the decoder 202. Note, in this embodiment, if the data contained in the SRC1 register is not to be destroyed, then that data must first be copied into another register before the execution of the operation. The copying would require an additional instruction. To simplify the description herein, the thee address addressing scheme will be described (i.e. SRC1, SRC2, and DEST). However, it should be remembered that the control signal, in one embodiment, may only include SRC1 and SRC2, and that SRC1 (or SRC2) identifies the destination register.

Where the control signal requires an operation, at step 303, functional unit 203 will be enabled to perform this operation on accessed data from register file 204. Once the operation has been performed in functional unit 203, at step 304, the result is stored back into register file 204 according to requirements of control signal 207.

Data and Storage Formats

Figure 4A:
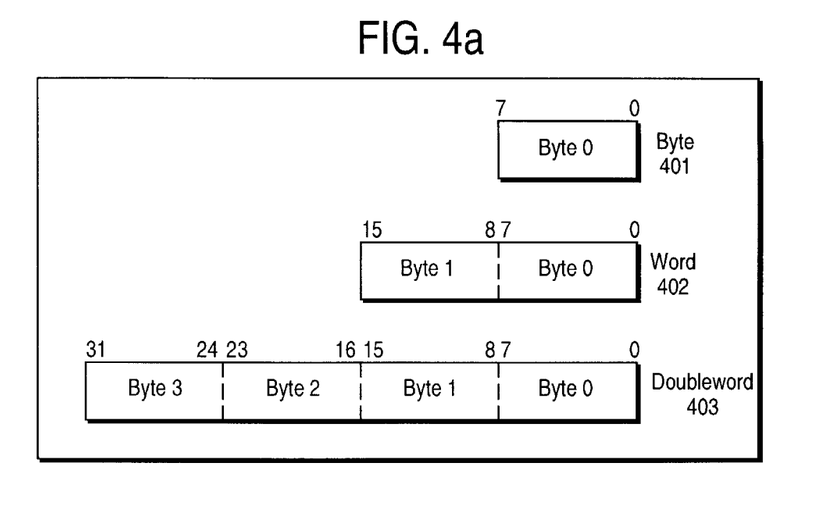
FIG. 4a illustrates memory data types.

FIG. 4a illustrates some of the data formats as may be used in the computer system of FIG. 1. These data formats are fixed point. Processor 109 can manipulate these data formats. Multimedia algorithms often use these data formats. A byte 401 contains eight bits of information. A word 402 contains sixteen bits of information, or two bytes. A doubleword 403 contains thirty-two bits of information, or four bytes. Thus, processor 109 executes control signals that may operate on any one of these memory data formats.

In the following description, references to bit, byte, word, and doubleword subfields are made. For example, bit six through bit zero of the byte $00111010_2$ (shown in base 2) represent the subfield $111010_2$.

Figure 4B:
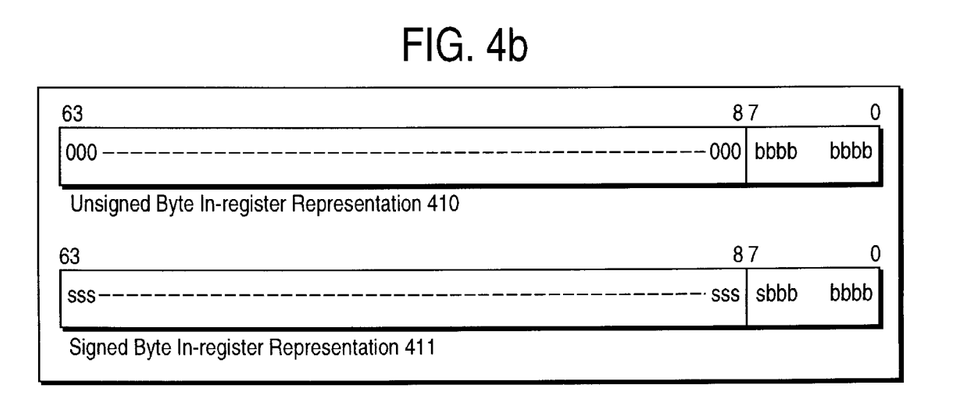
FIG. 4b, FIG. 4c and FIG. 4d illustrate in-register integer data representations.
Figure 4C:
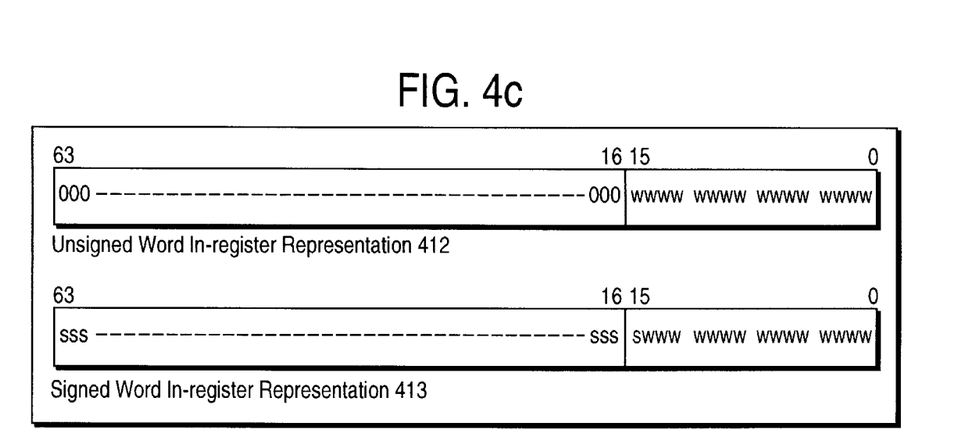
Figure 4D:
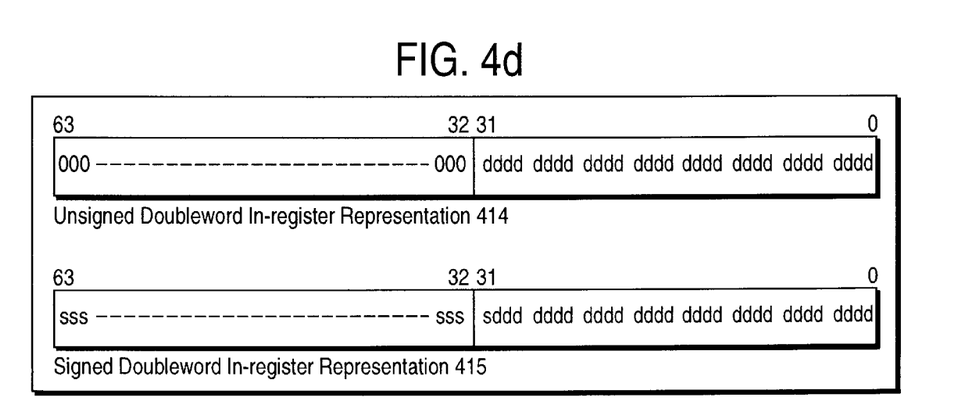

FIG. 4b through FIG. 4d illustrate in-register representations used in one embodiment of the present invention. For example, unsigned byte in-register representation 410 can represent data stored in a register in integer registers 201. In one embodiment, a register, in integer registers 201, is sixty-four bits in length. In another embodiment, a register, in integer registers 201, is thirty-two bits in length. For the simplicity of the description, the following describes sixty-four bit integer registers, however, thirty-two bit integer registers can be used.

Unsigned byte in-register representation 410 illustrates processor 109 storing a byte 401 in integer registers 201, the first eight bits, bit seven through bit zero, in that register are dedicated to the data byte 401. These bits are shown as {b}. To properly represent this byte, the remaining 56 bits must be zero. For an signed byte in-register representation 411, integer registers 201 store the data in the first seven bits, bit six through bit zero, to be data. The seventh bit represents the sign bit, shown as an {s}. The remaining bit sixty-three through bit eight are the continuation of the sign for the byte.

Unsigned word in-register representation 412 is stored in one register of integer registers 201. Bit fifteen through bit zero contain an unsigned word 402. These bits are shown as {w}. To properly represent this word, the remaining bit sixty-three through bit sixteen must be zero. A signed word 402 is stored in bit fourteen through bit zero as shown in the signed word in-register representation 413. The remaining bit sixty-three through bit fifteen is the sign field.

A doubleword 403 can be stored as an unsigned doubleword in-register representation 414 or a signed doubleword in-register representation 415. Bit thirty-one through bit zero of an unsigned doubleword in-register representation 414 are the data These bits are shown as {d}. To properly represent this unsigned doubleword, the remaining bit sixty-three through bit thirty-two must be zero. Integer registers 201 stores a signed doubleword in-register representation 415 in its bit thirty through bit zero; the remaining bit sixty-three through bit thirty-one are the sign field.

As indicated by the above FIG. 4b through FIG. 4d, storage of some data types in a sixty-four bit wide register is an inefficient method of storage. For example, for storage of an unsigned byte in-register representation 410 bit sixty-three through bit eight must be zero, while only bit seven through bit zero may contain non-zero bits. Thus, a processor storing a byte in a sixty-four bit register uses only 12.5% of the register's capacity. Similarly, only the first few bits of operations performed by functional unit 203 will be important.

Figure 5A:
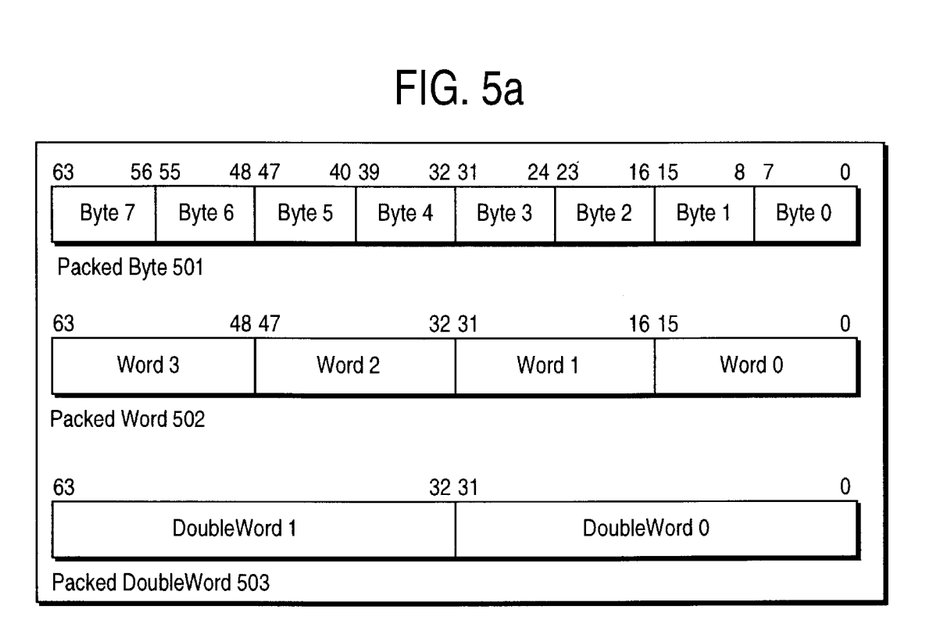
FIG. 5a illustrates packed data-types.

FIG. 5a illustrates the data formats for packed data. Three packed data formats are illustrated; packed byte 501, packed word 502, and packed doubleword 503. Packed byte, in one embodiment of the present invention, is sixty-four bits long containing eight data elements. Each data element is one byte long. Generally, a data element is an individual piece of data that is stored in a single register (or memory location) with other data elements of the same length. In one embodiment of the present invention, the number of data elements stored in a register is sixty-four bits divided by the length in bits of a data element.

Packed word 502 is sixty-four bits long and contains four word 402 data elements. Each word 402 data element contains sixteen bits of information.

Packed doubleword 503 is sixty-four bits long and contains two doubleword 403 data elements. Each doubleword 403 data element contains thirty-two bits of information.

Figure 5B:
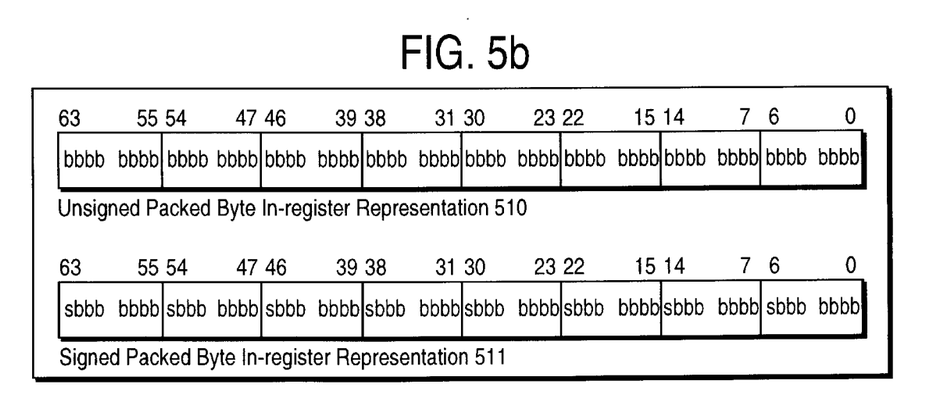
FIG. 5b, FIG. 5c and FIG. 5d illustrate in-register packed data representations.
Figure 5C:
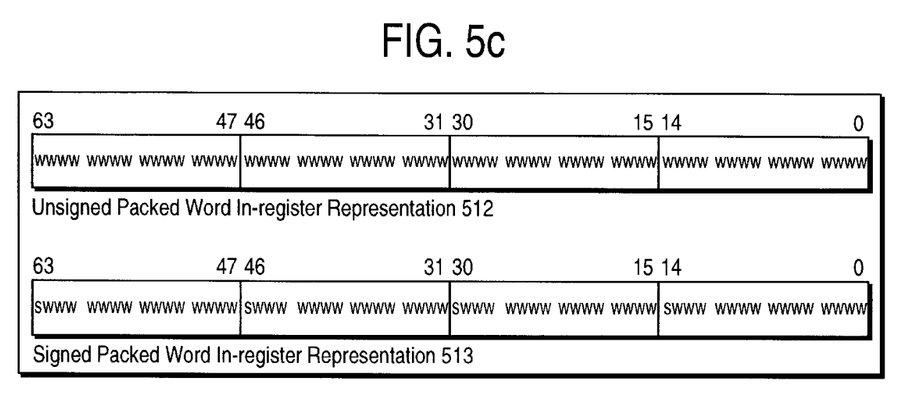
Figure 5D:
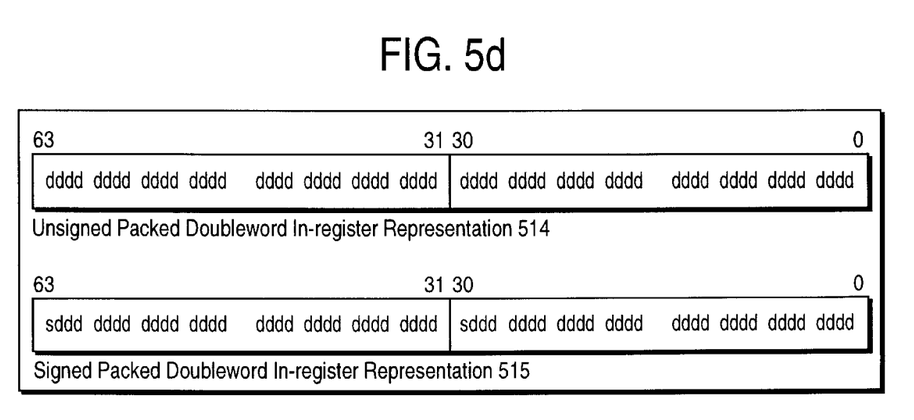

FIG. 5b through FIG. 5d illustrate the in-register packed data storage representation. Unsigned packed byte in-register representation 510 illustrates the storage of packed byte 501 in one of the registers $R_0$ 212a through $R_n$ 212af. Information for each byte data element is stored in bit seven through bit zero for byte zero, bit fifteen through bit eight for byte one, bit twenty-three through bit sixteen for byte two, bit thirty-one through bit twenty-four for byte three, bit thirty-nine through bit thirty-two for byte four, bit forty-seven through bit forty for byte five, bit fifty-five through bit forty-eight for byte six and bit sixty-three through bit fifty-six for byte seven. Thus, all available bits are used in the register. This storage arrangement increases the storage efficiency of the processor. As well, with eight data elements accessed, one operation can now be performed on eight data elements simultaneously. Signed packed byte in-register representation 511 is similarly stored in a register in registers 209. Note that only the eighth bit of every byte data element is the necessary sign bit; other bits may or may not be used to indicate sign.

Unsigned packed word in-register representation 512 illustrates how word three through word zero are stored in one register of registers 209. Bit fifteen through bit zero contain the data element information for word zero, bit thirty-one through bit sixteen contain the information for data element word one, bit forty-seven through bit thirty-two contain the information for data element word two and bit sixty-three through bit forty-eight contain the information for data element word three. Signed packed word in-register representation 513 is similar to the unsigned packed word in-register representation 512. Note that only the sixteenth bit of each word data element contains the necessary sign indicator.

Unsigned packed doubleword in-register representation 514 shows how registers 209 store two doubleword data elements. Doubleword zero is stored in bit thirty-one through bit zero of the register. Doubleword one is stored in bit sixty-three through bit thirty-two of the register. Signed packed doubleword in-register representation 515 is similar to unsigned packed doubleword in-register representation 514. Note that the necessary sign bit is the thirty-second bit of the doubleword data element.

As mentioned previously, registers 209 may be used for both packed data and integer data. In this embodiment of the present invention, the individual programming processor 109 may be required to track whether an addressed register, $R_1$ 212a for example, is storing packed data or simple integer/fixed point data. In an alternative embodiment, processor 109 could track the type of data stored in individual registers of registers 209. This alternative embodiment could then generate errors if, for example, a packed addition operation were attempted on simple/fixed point integer data.

Control Signal Formats

The following describes one embodiment of control signal formats used by processor 109 to manipulate packed data. In one embodiment of the present invention, control signals are represented as thirty-two bits. Decoder 202 may receive control signal 207 from bus 101. In another embodiment, decoder 202 can also receive such control signals from cache 206.

Figure 6A:
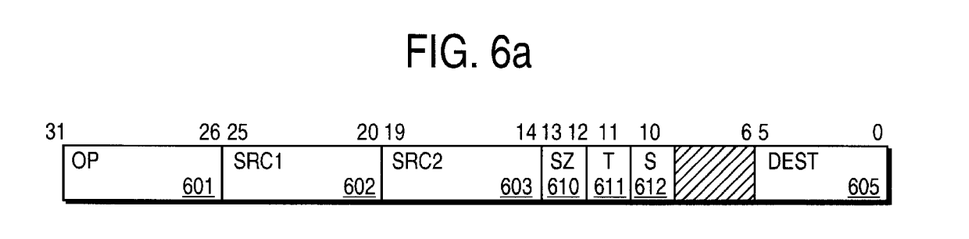
FIG. 6a illustrates a control signal format used in the computer system to indicate the use of packed data.

FIG. 6a illustrates a general format for a control signal operating on packed data. Operation field OP 601, bit thirty-one through bit twenty-six, provides information about the operation to be performed by processor 109; for example, packed addition, packed subtraction, etc. SRC1 602, bit twenty-five through twenty, provides the source register address of a register in registers 209. This source register contains the first packed data, Source1, to be used in the execution of the control signal. Similarly, SRC2 603, bit nineteen through bit fourteen, contains the address of a register in registers 209. This second source register contains the packed data, Source2, to be used during execution of the operation. DEST 605, bit five through bit zero, contains the address of a register in registers 209. This destination register will store the result packed data, Result, of the packed data operation.

Control bits SZ 610, bit twelve and bit thirteen, indicates the length of the data elements in the first and second packed data source registers. If SZ 610 equals $01_2$, then the packed data is formatted as packed byte 501. If SZ 610 equals $10_2$, then the packed data is formatted as packed word 502. SZ 610 equaling $00_2$ or $11_2$ is reserved, however, in another embodiment, one of these values could be used to indicate packed doubleword 503.

Control bit T 611, bit eleven, indicates whether the operation is to be carried out with saturate mode. If T 611 equals one, then a saturating operation is performed. If T 611 equals zero, then a nonsaturating operation is performed. Saturating operations will be described later.

Control bit S 612, bit ten, indicates the use of a signed operation. If S 612 equals one, then a signed operation is performed. If S 612 equals zero, then an unsigned operation is performed.

Figure 6B:
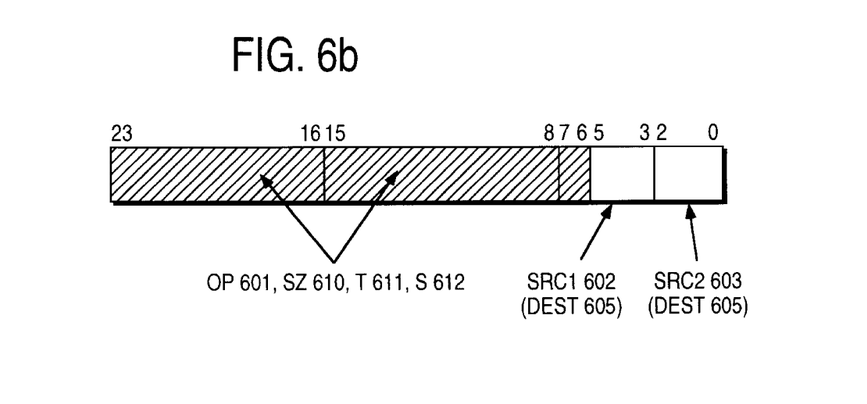
FIG. 6b illustrates a second control signal format that can be used in the computer system to indicate the use of packed data.

FIG. 6b illustrates a second general format for a control signal operating on packed data. This format corresponds with the general integer opcode format described in the "Pentium™ Processor Family User's Manual," available from Intel Corporation, Literature Sales, P.O. Box 7641, Mt. prospect, Ill., 60056-7641. Note that OP 601, SZ 610, T 611, and S 612 are all combined into one large field. For some control signals, bits three through five are SRC1 602. In one embodiment, where there is a SRC1 602 address, then bits three through five also correspond to DEST 605. In an alternate embodiment, where there is a SRC2 603 address, then bits zero through two also correspond to DEST 605. For other control signals, like a packed shift immediate operation, bits three through five represent an extension to the opcode field. In one embodiment, this extension allows a programmer to include an immediate value with the control signal, such as a shift count value. In one embodiment, the immediate value follows the control signal. This is described in more detail in the "Pentium™ Processor Family User's Manual," in appendix F, pages F-1 through F-3. Bits zero through two represent SRC2 603. This general format allows register to register, memory to register, register by memory, register by register, register by immediate, register to memory addressing. Also, in one embodiment, this general format can support integer register to register, and register to integer register addressing.

Description of Saturate/Unsaturate

As mentioned previously, T 611 indicates whether operations optionally saturate. Where the result of an operation, with saturate enabled, overflows or underflows the range of the data, the result will be clamped. Clamping means setting the result to a maximum or minimum value should a result exceed the range's maximum or minimum value. In the case of underflow, saturation clamps the result to the lowest value in the range and in the case of overflow, to the highest value. The allowable range for each data format is shown in Table 1.

TABLE 1

| Data Format | Minimum Value | Maximum Value |
| --- | --- | --- |
| Unsigned Byte | 0 | 255 |
| Signed Byte | −128 | 127 |
| Unsigned Word | 0 | 65535 |
| Signed Word | −32768 | 32767 |
| Unsigned Doubleword | 0 | $2^{64}-1$ |
| Signed Doubleword | 11 $2^{63}$ | $2^{63}-1$ |

As mentioned above, T 611 indicates whether saturating operations are being performed. Therefore, using the unsigned byte data format, if an operation's result=258 and saturation was enabled, then the result would be clamped to 255 before being stored into the operation's destination register. Similarly, if an operation's result=−32999 and processor 109 used signed word data format with saturation enabled, then the result would be clamped to −32768 before being stored into the operation's destination register.

Shift Operation

In one embodiment of the present invention, the performance of CSC applications is improved by not only supporting a standard CISC instruction set (unpacked data operations), but by supporting a shift operation on packed data. The packed shift can be used to increase the speed of fixed-point implements of Fast Fourier Transforms, Cosine Transforms, and other digital image and audio signal processing algorithms.

In one embodiment of the present invention, the SRC1 register contains the data (Source1) to be shifted, the SRC2 register contains the data (Source2) representing the shift count, and DEST register will contain the result of the shift (Result). That is, Source1 will have each data element independently shifted by the shift count. In one embodiment, Source2 is interpreted as an unsigned 64 bit scalar. In another embodiment, Source2 is packed data and contains shift counts for each corresponding data element in Source1.

In one embodiment of the present invention, both arithmetic shifts and logical shifts are supported. An arithmetic shift, shifts the bits of each data element down by a specified number, and fills the high order bit of each data element with the initial value of the sign bit. A shift count greater than seven for packed byte data, greater than fifteen for packed word data, or greater than thirty-one for packed doubleword, causes the each Result data element to be filled with the initial value of the sign bit. A logical shift can operate by shifting bits up or down. In a shift right logical, the high order bits of each data element are filled with zeroes. A shift left logical causes the least significant bits of each data element to be filled with zeroes.

In one embodiment of the present invention, a shift right arithmetic, the shift right logical, and the shift left logical operations are supported for packed bytes and packed words. In another embodiment of the present invention, these operations are supported for packed doublewords also.

Figure 7:
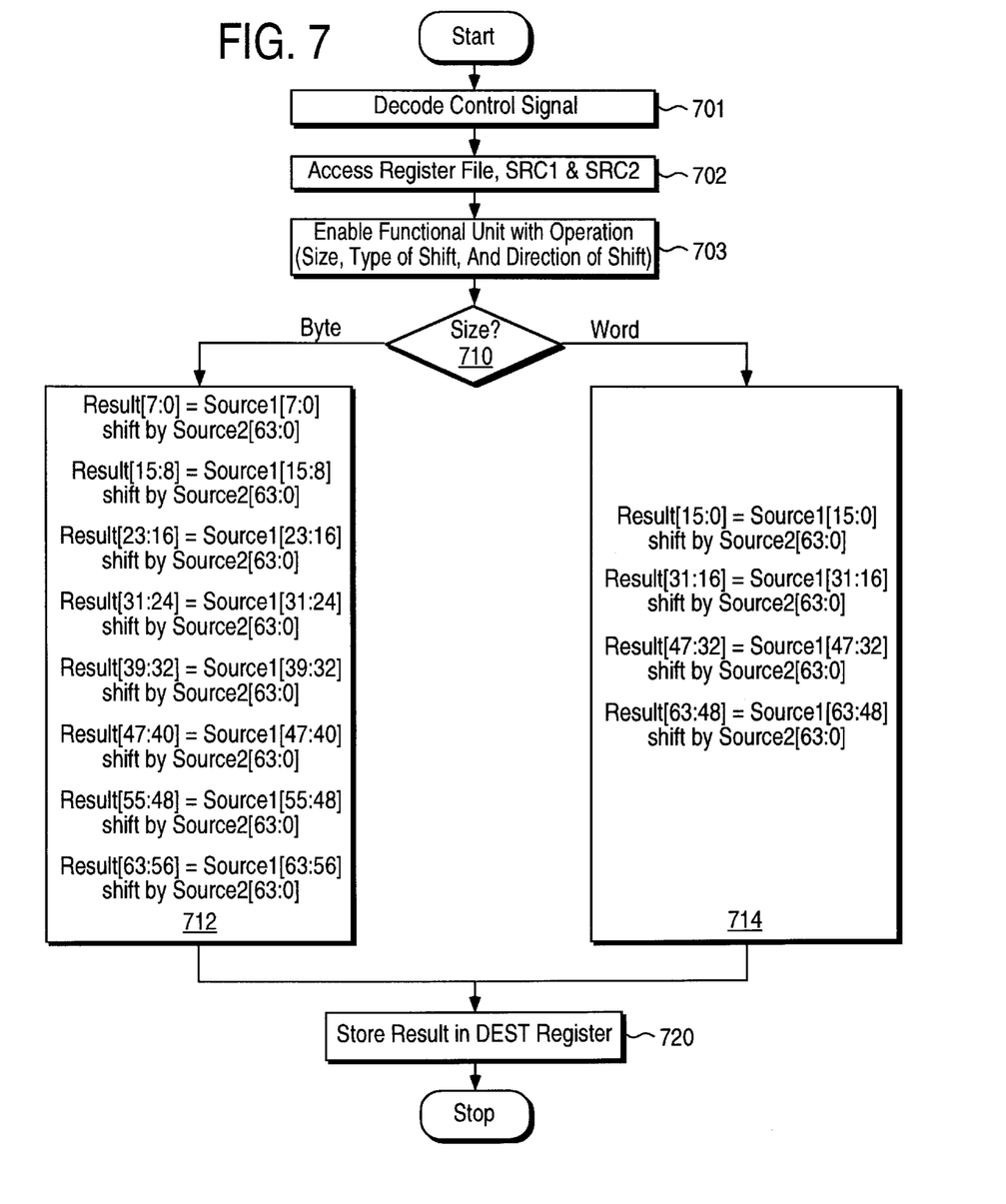
FIG. 7 illustrates one embodiment of a method followed by a processor when performing a shift operation on packed data.

FIG. 7 illustrates one embodiment of a method of performing a shift operation on packed data. This embodiment can be implemented in the processor 109 of FIG. 2.

At step 701, decoder 202 decodes control signal 207 received by processor 109. Thus, decoder 202 decodes: the operation code for the appropriate shift operation; SRC1 602, SRC2 603 and DEST 605 addresses in integer registers 209; saturate/unsaturate (not necessarily needed for shift operations), signed/unsigned (again not necessarily needed), and length of the data elements in the packed data.

At step 702, via internal bus 205, decoder 202 accesses integer registers 209 in register file 204 given the SRC1 602 and SRC2 603 addresses. Integer registers 209 provides functional unit 203 with the packed data stored in the SRC1 602 register (Source1), and the scalar shift count stored in SRC2 603 register (Source2). That is, integer registers 209 communicate the packed data to functional unit 203 via internal bus 205.

At step 703, decoder 202 enables functional unit 203 to perform the appropriate packed shift operation. Decoder 202 further communicates, via internal bus 205, the size of data elements, the type of shift operation, and the direction of the shift (for logical shifts).

At step 710, the size of the data element determines which step is to be executed next. If the size of the data elements is eight bits (byte data), then functional unit 203 performs step 712. However, if the size of the data elements in the packed data is sixteen bits (word data), then functional unit 203 performs step 714. In one embodiment, only eight bit and sixteen bit data element size packed shifts are supported. However, in another embodiment, a thirty-two bit data element size packed shift is also supported.

Assuming the size of the data elements is eight bits, then step 712 is executed. In step 712, the following is performed. Source1 bits seven through zero are shifted by the shift count (Source2 bits sixty-three through zero) generating Result bits seven through zero. Source1 bits fifteen through eight are shifted by the shift count generating Result bits fifteen through eight. Source1 bits twenty-three through sixteen are shifted by the shift count generating Result bits twenty-three through sixteen. Source1 bits thirty-one through twenty-four are shifted by the shift count generating Result bits thirty-one through twenty-four. Source1 bits thirty-nine through thirty-two are shifted by the shift count generating Result bits thirty-nine through thirty-two. Source1 bits forty-seven through forty are shifted by the shift count generating Result forty-seven through forty. Source1 bits fifty-five through forty-eight are shifted by the shift count generating Result bits fifty-five through forty-eight. Source1 bits sixty-three through fifty-six are shifted by the shift count generating Result bits sixty-three through fifty-six.

Assuming the size of the data elements is sixteen bits, then step 714 is executed. In step 714, the following is performed. Source1 bits fifteen through zero are shifted by the shift count generating Result bits fifteen through zero. Source1 bits thirty-one through sixteen are shifted by the shift count generating Result bits thirty-one through sixteen. Source1 bits forty-seven through thirty-two are shifted by the shift count generating Result bits forty-seven through thirty-two. Source1 bits sixty-three through forty-eight are shifted by the shift count generating Result bits sixty-three through forty-eight.

In one embodiment, the shifts of step 712 are performed simultaneously. However, in another embodiment, these shifts are performed serially. In another embodiment, some of these shifts are performed simultaneously and some are performed serially. This discussion applies to the shifts of step 714 as well.

At step 720, the Result is stored in the DEST register.

Table 2 illustrates the in-register representation of packed shift right arithmetic operation. The first row of bits is the packed data representation of Source1. The second row of bits is the data representation of Source2. The third row of bits is the packed data representation of the Result. The number below each data element bit is the data element number. For example, Source1 data element three is $10000000_2$.

Packed Data Circuits

Figure 8:
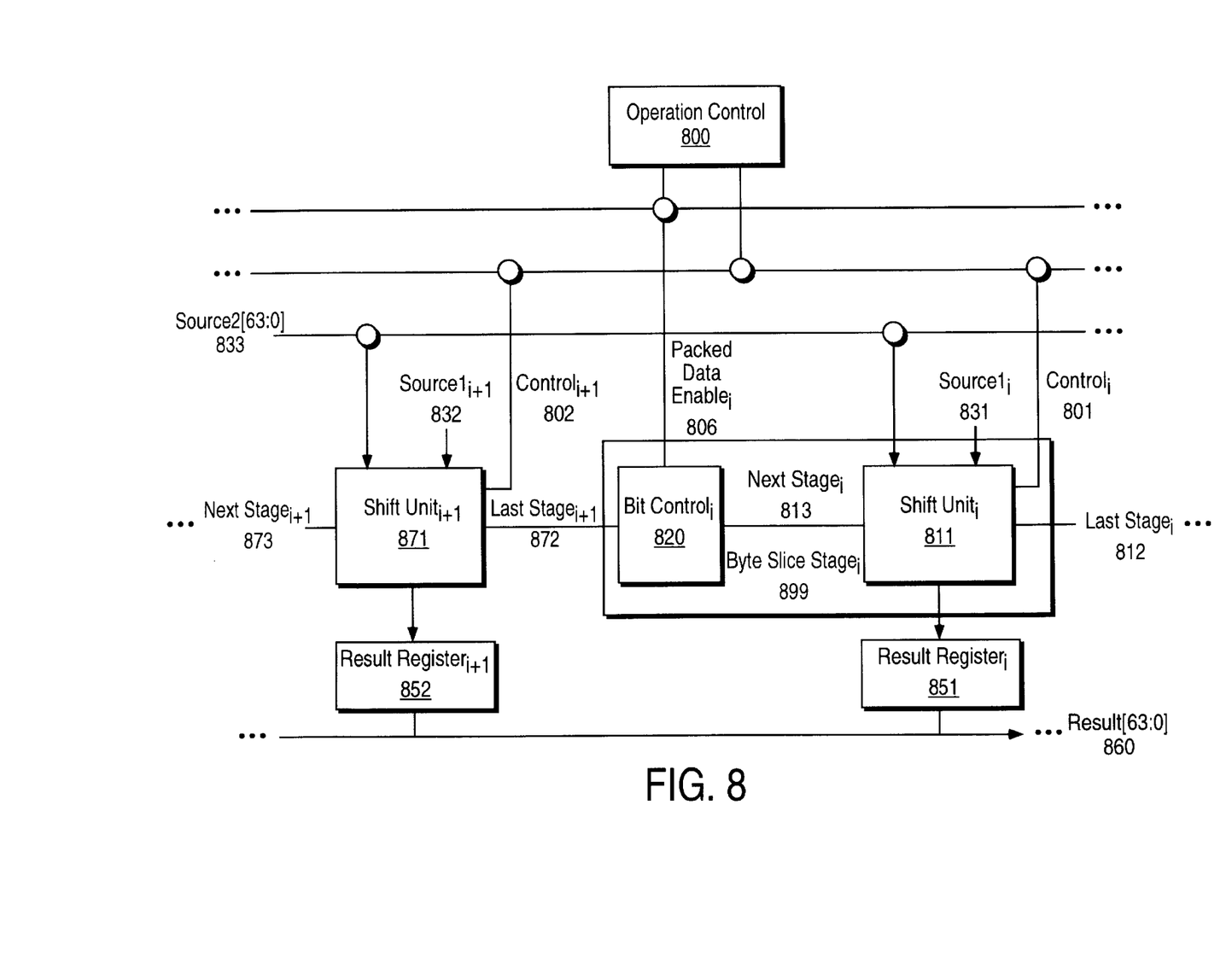
FIG. 8 illustrates a circuit capable of manipulating individual bytes of packed data.

In one embodiment, the shift operation can occur on multiple data elements in the same number of clock cycles as a single shift operation on unpacked data. To achieve execution in the same number of clock cycles, parallelism is used. That is, registers are simultaneously instructed to perform the shift operation on the data elements. This is discussed in more detail below. FIG. 8 illustrates one embodiment of a portion of a circuit that can perform a shift operation on packed data in the same number of clock cycles as a shift operation on unpacked data.

FIG. 8 illustrates the use of a modified byte slice shift circuit, byte slice stage$_i$ 899. Each byte slice, except for the most significant data element byte slice, includes a shift unit and bit control. The most significant data element byte slice need only have a shift unit.

Shift unit$_i$ 811 and shift unit$_{i+1}$ 871 each allow eight bits from Source1 to be shifted by the shift count. In one embodiment, each shift unit operates like a known eight bit shift circuit. Each shift unit has a Source1 input, a Source2 input, a control input, a next stage signal, a last stage signal, and a result output. Therefore, shift unit$_i$ 811 has Source1$_i$ 831 input, Source2[63:0] 833 input, control$_i$ 801 input, next stage$_i$ 813 signal, last stage$_i$ 812 input, and a result stored in result register$_i$ 851. Therefore, shift unit$_{i+1}$ 871 has Source1$_{i+1}$ 832 input, Source2[63:0] 833 input, control$_{i+1}$ 802 input, next stage$_{i+1}$ 873 signal, last stage$_{i+1}$ 872 input, and a result stored in result register$_{i+1}$ 852.

The Source1 input is typically an eight bit portion of Source1. The eight bits represents the smallest type of data

TABLE 2

| 00101010 | 01010101 | 01010101 | 11111111 | 10000000 | 01110000 | 10001111 | 10001000 |
|---|---|---|---|---|---|---|---|
| 7 | 6 | 5 | 4 | 3 | 2 | 1 | 0 |
| Shift | Shift | Shift | Shift | Shift | Shift | Shift | Shift |
| 00000000 | 00000000 | 00000000 | 00000000 | 00000000 | 00000000 | 00000000 | 00000100 |
| = | = | = | = | = | = | = | = |
| 00000010 | 00000101 | 00000101 | 11111111 | 11110000 | 00000111 | 11111000 | 11111000 |
| 7 | 6 | 5 | 4 | 3 | 2 | 1 | 0 |

Table 3 illustrates the in-register representation of packed shift right logical operation on packed byte data.

TABLE 3

| 00101010 | 01010101 | 01010101 | 11111111 | 10000000 | 01110000 | 10001111 | 10001000 |
|---|---|---|---|---|---|---|---|
| 7 | 6 | 5 | 4 | 3 | 2 | 1 | 0 |
| Shift | Shift | Shift | Shift | Shift | Shift | Shift | Shift |
| 00000000 | 00000000 | 00000000 | 00000000 | 00000000 | 00000000 | 00000000 | 00000011 |
| = | = | = | = | = | = | = | = |
| 00000101 | 00001010 | 00001010 | 00011111 | 00010000 | 00001110 | 00010001 | 00010001 |
| 7 | 6 | 5 | 4 | 3 | 2 | 1 | 0 |

Table 4 illustrates the in-register representation of packed shift left logical operation on packed byte data.

unit receives the same shift count from Source2[63:0] 833. Operation control 800 transmits control signals to enable

TABLE 4

| 00101010 | 01010101 | 01010101 | 11111111 | 10000000 | 01110000 | 10001111 | 10001000 |
|---|---|---|---|---|---|---|---|
| 7 | 6 | 5 | 4 | 3 | 2 | 1 | 0 |
| Shift | Shift | Shift | Shift | Shift | Shift | Shift | Shift |
| 00000000 | 00000000 | 00000000 | 00000000 | 00000000 | 00000000 | 00000000 | 00000011 |
| = | = | = | = | = | = | = | = |
| 01010000 | 10101000 | 10101000 | 11111000 | 00000000 | 10000000 | 01111000 | 01000000 |
| 7 | 6 | 5 | 4 | 3 | 2 | 1 | 0 | each shift unit to perform the required shift. The control signals are determined from the type of shift (arithmetic/logical) and the direction of the shift. The next stage signal is received from the bit control for that shift unit. The shift unit will shift the most significant bit out/in on the next stage signal, depending on the direction of the shift (left/right). Similarly, each shift unit will shift the least significant bit out/in on the last stage signal, depending on the direction of the shift (right/left). The last stage signal being received from the bit control unit of the previous stage. The result output represents the result of the shift operation on the portion of Source1 the shift unit is operating upon.

Bit control$_i$ 820 is enabled from operation control 800 via packed data enable$_i$ 806. Bit control$_i$ 820 controls next stage$_i$ 813 and last stage$_{i+1}$ 872. Assume, for example, shift unit$_i$ 811 is responsible for the eight least significant bits of Source1, and shift unit$_{i+1}$ 871 is responsible for the next eight bits of Source1. If a shift on packed bytes is performed, bit control$_i$ 820 will not allow the least significant bit from shift unit$_{i+1}$ 871 to be communicated with the most significant bit of shift unit$_i$ 811. However, a shift on packed words is performed, then bit control$_i$ 820 will allow the least significant bit from shift unit$_{i+1}$ 871 to be communicated with the most significant bit of shift unit$_i$ 811.

For example, in Table 5, a packed byte arithmetic shift right is performed. Assume that shift unit$_{i+1}$ 871 operates on data element one, and shift unit$_i$ 811 operates on data element zero. Shift unit$_{i+1}$ 871 shifts its least significant bit out. However operation control 800 will cause bit control$_i$ 820 to stop the propagation of that bit, received from last stage$_{i+1}$ 821, to next stage$_i$ 813. Instead, shift unit$_i$ 811 will fill the high order bits with the sign bit, Source1[7].

TABLE 5

| ... | ... | ... | ... | ... | ... | 00001110 | 10001000 |
|---|---|---|---|---|---|---|---|
| 7 | 6 | 5 | 4 | 3 | 2 | 1 | 0 |
| Shift | Shift | Shift | Shift | Shift | Shift | Shift | Shift |
| ... | ... | ... | ... | ... | ... | ... | 00000001 |
| = | = | = | = | = | = | = | = |
| ... | ... | ... | ... | ... | ... | 00001111 | 01000100 |
| 7 | 6 | 5 | 4 | 3 | 2 | 1 | 0 |

However, if a packed word arithmetic shift is performed, then the least significant bit of shift unit$_{i+1}$ 871 will be communicated to the most significant bit of shift unit$_i$ 811. Table 6 illustrates this result. This communication would be allowed for packed doubleword shifts as well.

TABLE 6

| ... | ... | ... | 00001110 1000100 |
|---|---|---|---|
| 3 | 2 | 1 | 0 |
| Shift | Shift | Shift | Shift |
| ... | ... | ... | 00000001 |
| = | = | = | = |
| ... | ... | ... | 00000111 01000100 |
| 3 | 2 | 1 | 0 |

Each shift unit is optionally connected to a result register. The result register temporarily stores the result of the shift operation until the complete result, Result[63:0] 860 can be transmitted to the DEST register.

For a complete sixty-four bit packed shift circuit, eight shift units and seven bit control units are used. Such a circuit can also be used to perform a shift on a sixty-four bit unpacked data, thereby using the same circuit to perform the unpacked shift operation and the packed shift operation.

A processor having shift operations that operate on multiple data elements has been described.

What is claimed is:

1. A processor comprising:
   a decoder operable to decode a first instruction, said instruction operable to specify a shift operation to be performed on a first packed data sequence having a plurality of packed data elements, said first instruction further operable to specify a variable quantity of packed data elements included in said first packed data sequence and a variable size of the data elements included in said packed data sequence; and
   a circuit coupled to said decoder, said circuit operable to shift said plurality of packed data elements simultaneously and independently, in response to said first instruction.

2. The processor of claim 1, wherein said circuit is further operable to logically shift said plurality of packed data elements, wherein a shift count number of bits in each packed data element are filled with zeros.

3. The processor of claim 2, wherein the first packed data sequence includes two packed data elements, each having thirty-two bits.

4. The processor of claim 2, wherein the first packed data sequence includes four packed data elements, wherein each packed element of the first packed data sequence represents a packed word having sixteen bits.

5. The processor of claim 1, wherein said circuit is further operable to perform arithmetic shifting of said plurality of packed data elements, wherein a shift count number of bits in each packed data element are filled with a sign bit for the respective packed data elements.

6. The processor of claim 5, wherein the first packed data sequence includes two packed elements, each having thirty-two bits.

7. The processor of claim 5, wherein the first packed data sequence includes four packed data elements, wherein each packed element of the first packed data sequence represents a packed word having sixteen bits.

8. A processor comprising:
   a decoder operable to decode a first control signal, the control signal operable to specify a shift operation to be performed on plurality of packed data elements included in a first packed data sequence, said control signal further operable to specify a variable number of packed data elements included in said first packed data sequence and a variable size of said packed data elements included in said first packed data sequence; and
   a circuit coupled to said decoder, said circuit operable to shift the packed data elements simultaneously and independent of each other, in response to said first control signal.

9. The processor of claim 8, wherein said circuit is operable to logically shift the plurality of packed data elements, wherein a shift count number of bits in each packed data element are filled with zeros.

10. The processor of claim 9, wherein the first packed data sequence includes four packed data elements, wherein each packed element of the first packed data sequence represents a packed word having sixteen bits.

11. The processor of claim 9, wherein said plurality of packed data elements includes two packed double words, each having thirty-two bits.

12. The processor of claim 8, wherein said circuit is operable to perform arithmetic shifting of the plurality of packed data elements, wherein a shift count number of bits in each packed data element are filled with a sign bit for the respective packed data elements.

13. The processor of claim 12, wherein the first packed data sequence includes four packed data elements, wherein each packed element of the first packed data sequence represents a packed word having sixteen bits.

14. The processor of claim 12, wherein said plurality of packed data elements includes two packed double words, each having thirty-two bits.

* * * * *